Feb. 4, 1930.  H. D. GEYER  1,745,790
MOLDED RUBBER RUNNING BOARD FOR AUTOMOBILES
Filed Oct. 15, 1925

Inventor
Harvey D. Geyer
By Spencer Sewall & Hardman
his Attorneys

Patented Feb. 4, 1930

1,745,790

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

MOLDED-RUBBER RUNNING BOARD FOR AUTOMOBILES

Application filed October 15, 1925. Serial No. 62,622.

This invention relates to molded rubber running boards for automobile bodies, or similar stepping boards.

An object of this invention is to provide an improved form of running board made of molded hard rubber reinforced with light metal.

Another object is to provide a molded hard rubber running board having a tread surface of softer rubber, whereby soft rubber step plates or other non-skid step plates are rendered unnecessary.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figure 1:
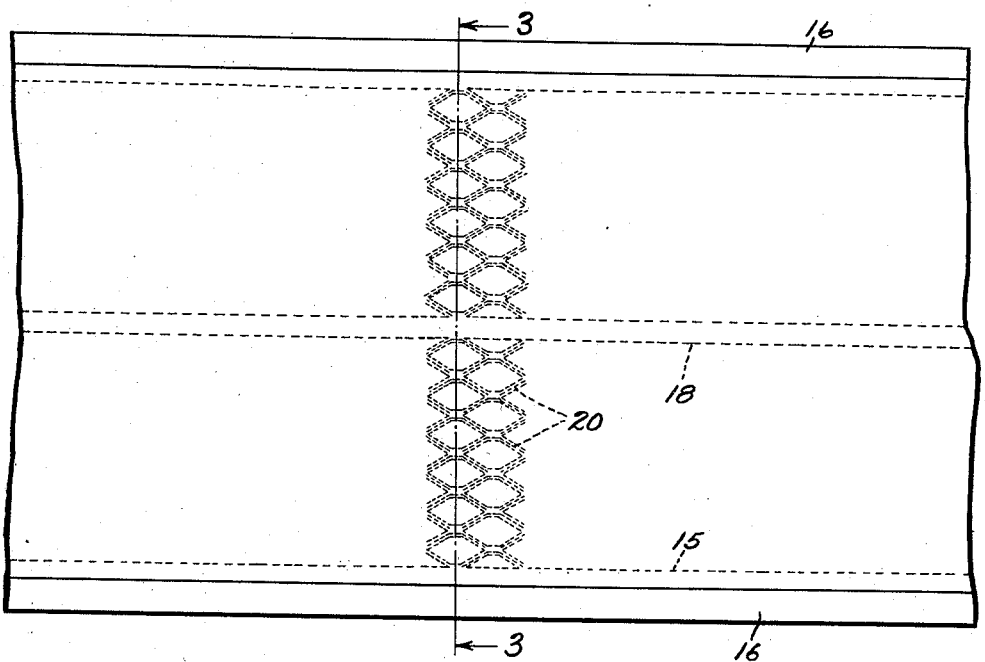
Fig. 1 is a plan view of a portion of the length of a running board made according to this invention.
Figure 2:
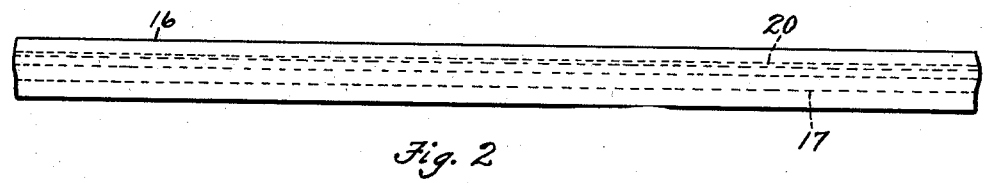
Fig. 2 is a side elevation of Fig. 1.

The running board is preferably provided with longitudinally extending depending ribs 10 and 11 along its side edges for strengthening purposes. It is also found that one or more strengthening ribs depending from the web portion 12 may be added with advantage since such addition will permit less thickness of the web portion 12. In the drawings only a single strengthening rib 13 is shown depending from the web portion 12 between the two side ribs 10 and 11.

A pressed sheet metal reinforcing member, designated as a whole by numeral 15, is first made up in the form clearly illustrated in the drawings. The edges of the metal member 15 is provided with stiffening flanges 16 which have their bottom edges turned up as shown at 17. The turned up ends 17 firmly anchor the bottom edges of flanges 16 in the hard rubber. The metal member 15 is also provided with a stiffening loop portion 18 which depends within the central rib 13 of the molded hard rubber. The portions 20 of the member 15 which lies within the relatively thin web portions 12 is preferably of the slotted and expanded sheet metal form such as clearly illustrated. The art of expanding sheet metal in this form for use as metal lathing is well known and need not be described herein in greater detail. However any other means for lightening the portions 20 and forming anchoring projections thereon for the hard rubber may be used if desired. It will be obvious to those skilled in the pressed metal art that the metal member 15 may be easily formed from a single piece of sheet steel.

Figure 3:
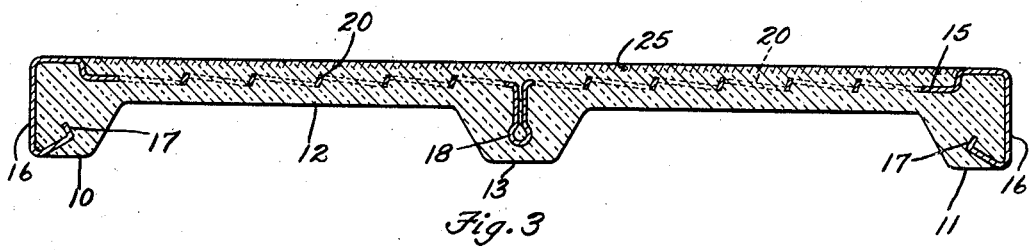
Fig. 3 is a transverse section taken on line 3—3 of Fig. 1.
Figure 4:
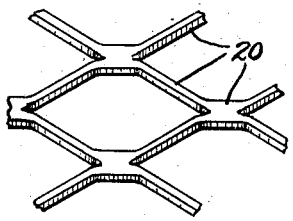
Fig. 4 is a detail view showing in plan a portion of the expanded metal reinforcing member.

The reinforcing member 15 is positioned in the rubber vulcanizing mold so that the flanges 16 lie adjacent the mold cavity walls. Hence the outer surface of said flanges 16 will be exposed on the finished article, as clearly shown in Fig. 3, while the remaining portions of the member 15 will be firmly anchored within the vulcanized rubber. Preferably when the mold is being filled with the unvulcanized rubber compound a relatively thin layer of rubber compound of such chemical constituency that it will vulcanize to flexible rubber is laid upon the tread portion of the running board. Therefore during the vulcanization process all the rubber will be cured at the same time but the main portion of the rubber will be cured to hard rubber while a relatively thin layer 25 on the tread portion will be cured to fairly soft rubber such as to form a non-skid tread surface on the running board. If desired this top layer 25 may be formed of any desired colored rubber or mixture of colors for decorative purposes while the hard rubber portion is of black rubber which is ordinarily the cheapest color. Since the layer of soft rubber is compounded separately from the hard rubber it will be a simple matter to mix in the desired colors in the soft rubber compound only.

While the form of embodiment of the present invention as herein disclosed, constitutes a preferred form, it is to be understood that other forms might be adopted, all coming within the scope of the claims which follow.

What is claimed is as follows:

1. In an automobile body, a molded rubber running board having a depending strengthening rib extending longitudinally along the central portion thereof, and a relatively light reinforcing metal member molded in place interiorly of the web portion of said running board, said reinforcing member having a depending flange molded in said strengthening rib.

2. In an automobile body having a chassis frame, a running board extending longitudinally alongside the chassis frame and having a relatively narrow width compared to its length, said running board comprising: a molded hard rubber body having depending ribs at its lateral edges and an expanded sheet metal reinforcing member molded in situ therein and extending to the lateral edges of said rubber body, and having portions bent around and encasing said depending ribs.

3. In an automobile body having a chassis frame, a running board extending longitudinally alongside the chassis frame and having a relatively narrow width compared to its length, said running board comprising: a molded rubber main body and a reinforcing expanded sheet metal member molded in place therein, said metal member having an unexpanded lateral edge pressed to substantially channel form and exposed at the lateral edge of the rubber body and forming a guard rail therefor.

4. In an automobile body having a chassis frame, a running board extending longitudinally alongside the chassis frame and having a relatively narrow width compared to its length, said running board comprising: a molded rubber main body having depending lateral reinforcing ribs, and a one-piece metal reinforcing member molded in place in said rubber body and extending over substantially the entire plan area thereof, said metal member having its lateral edge portions bent down to reinforce said depending ribs of the rubber body.

5. In an automobile body having a chassis frame, a running board extending longitudinally alongside the chassis frame and having a relatively narrow width compared to its length, said running board comprising: a molded rubber main body having a central depending strengthening rib extending longitudinally thereof, and a one-piece metal reinforcing member molded between the upper and lower surfaces of said rubber body, said metal member having a loop portion bent down so as to lie within and reinforce said rib.

6. In an automobile body having a chassis frame, a running board extending longitudinally alongside the chassis frame and having a relatively narrow width compared to its length, said running board comprising: a molded rubber main body having depending lateral reinforcing ribs and a web portion extending therebetween, a relatively light reinforcing metal member molded in place within said web portion, said metal member having exposed lateral edge portions formed to substantially encase the lateral ribs of said rubber body.

In testimony whereof I hereto affix my signature.

HARVEY D. GEYER.